United States Patent [19]

Köhler et al.

[11] Patent Number: 4,666,972

[45] Date of Patent: May 19, 1987

[54] THERMOPLASTIC MOULDING COMPOSITIONS BASED ON POLYALKYLENE TEREPHTHALATE AND POLYMER AND A PROCESS FOR THE PRODUCTION THEREOF

[75] Inventors: Karl-Heinz Köhler, Krefeld; Christian Lindner, Cologne; Dieter Rempel, Leverkusen; Gunter Weber, Krefeld; Karl-Heinz Ott, Leverkusen; Rudolph Binsack, Krefeld, all of Fed. Rep. of Germany

[73] Assignee: Bayer Aktiengesellschaft, Leverkusen, Fed. Rep. of Germany

[21] Appl. No.: 743,668

[22] Filed: Jun. 11, 1985

[30] Foreign Application Priority Data

Jun. 20, 1984 [DE] Fed. Rep. of Germany ....... 3422862

[51] Int. Cl.$^4$ ............................................. C08L 67/02
[52] U.S. Cl. ...................................... 524/504; 525/64; 525/165; 525/166; 525/177
[58] Field of Search ................ 525/64, 166, 177, 165; 524/504

[56] References Cited

U.S. PATENT DOCUMENTS

| | | | |
|---|---|---|---|
| 3,671,487 | 6/1972 | Abolins | 525/165 |
| 3,723,373 | 3/1973 | Lucas | 525/165 |
| 3,919,353 | 11/1975 | Castelnuovo | 525/69 |
| 4,002,581 | 1/1977 | Dolce | 525/177 |
| 4,022,748 | 5/1977 | Schlichting | 524/452 |
| 4,096,202 | 6/1978 | Farnham | 523/201 |
| 4,191,678 | 3/1980 | Smith | 524/371 |
| 4,271,064 | 6/1981 | Dieck | 524/445 |
| 4,292,233 | 9/1981 | Binsack | 525/64 |
| 4,337,192 | 6/1982 | Campbell | 523/212 |
| 4,356,281 | 10/1982 | Brink | 525/165 |
| 4,396,742 | 8/1983 | Binsack | 525/64 |
| 4,417,026 | 11/1983 | Lindner | 525/64 |
| 4,446,276 | 5/1984 | Binsack | 525/64 |

*Primary Examiner*—John C. Bleutge
*Assistant Examiner*—Patricia A. Short
*Attorney, Agent, or Firm*—Connolly & Hutz

[57] ABSTRACT

Polyalkylene terephthalates which contain a fluorinated polyolefin in addition to a polymer having a glass transition temperature of less than $-30°$ C., are very tough, exhibit good stability to thermal shaping and hardness, and have a high modulus of elasticity and improved stress/strain behavior.

8 Claims, No Drawings

THERMOPLASTIC MOULDING COMPOSITIONS BASED ON POLYALKYLENE TEREPHTHALATE AND POLYMER AND A PROCESS FOR THE PRODUCTION THEREOF

The invention relates to thermoplastic moulding compositions from polyalkylene terephthalate and polymer with a glass transition temperature below −30°C., which consists in part of fluorinated polyolefin, and a process for producing these moulding compositions.

Moulding compositions based on polyalkylene terephthalate and polymer have excellent properties (U.S. Pat. No. 3,706,699, DE-OS No. 16 94 200, =U.S. Pat. Nos. 3,591,659, 4,086,296, DE-OS No. 22 48 242, =U.S. Pat. Nos. 4,013,613 +4,097,446, DE-PS No. 23 43 609=U.S. Pat. No. 3,864,428, DE-OS No. 23 64 318 =U.S. Pat. No. 4,080,354, DE-PS No. 23 48 377=U.S. Pat. No. 3,919,353, DE-PS 24 44 584=U.S. Pat. Nos. 4,022,748, 4,111,892 and 4,257,929, DE-OS No. 27 26 256=U.S. Pat. No. 4,096,202). In practice however, it has been found that, in some cases, the moulding compositions do not not meet very high requirements in terms of toughness whereas, in other cases, valuable properties such as rigidity, stability to thermal shaping and hardness are adversely affected by the addition of polymer.

The aim of the invention was to provide very tough moulding compositions based on polyalkylene terephthlate in which the known good properties of polyalkylene terephthlates are still substantially retained. In particular, moulding compositions with a combination of high toughness (even at low temperatures), high modulus of elasticity and improved stress/strain behaviour were desired.

Mixtures of polyalkylene terephthalate and polymer surprisingly meet these high requirements to a substantial extent if the polymer is composed of at least one polymer having a glass transition temperature below −30° C. and a fluorinated polyolefin, for example polytetrafluoroethylene.

The use of fluorinated polyolefins as an addition to polyalkylene terephthalates to improve the properties thereof, in particular to improve the crystallisation rate, the dripping behaviour in the event of fire, the wear resistance and the processibility, is known (DE-OS Nos. 16 94 217, 24 33 966, 24 52 329, 26 15 071=U.S. Pat. No. 4,191,678, DE-OS No. 26 55 162=U.S. Pat. Ser. No. 4,002,581, DE-OS No. 31 31 781=U.S. Pat. No. 4,337,192, EP-A 46 052, U.S. Pat. No. 3,723,373).

None of these literature references deals with the problems set out at the outset, so they could not provide suggestions for solving it.

The invention provides thermoplastic moulding com-compositions composed of

A. 65 to 99% by weight, based on the sum A+B, of polyalkylene terephthalate and
B. 1 to 35% by weight, based on the sum A+B, of polymer, in which compositions the polymer B comprises at least one polymer having a glass transition temperature below −30° C., preferably below −40° C. and, based on the moulding composition A+B, from 0.1 to 0.9, preferably from 0.2 to 0.8, in particular from 0.3 to 0.7% by weight of fluorinated polyolefin.

The improvements achieved in the properties are particularly marked if polymers B obtained by mixing aqeous dispersions of the fluorinated polyolefin and the polymer with a glass transition temperature below −30° C. and by common precipitation are used.

The moulding compositions according to the invention are considerably tougher, particularly at low temperatures, and have much higher moduli of elasticity and substantially superior stress/strain properties than moulding compositions which are free from fluorinated polyolefins.

Polyalkylene terephthalates A in the context of the invention are reaction products of aromatic dicarboxylic acids or the reactive derivatives thereof (for example dimethyl esters or anhydrides) and aliphatic, cycloaliphatic or araliphatic diols and mixtures of these reaction products.

Preferred polyalkylene terephthalates A can be produced from terephthalic acid (or reactive derivatives thereof) and aliphatic or cycloaliphatic diols containing from 2 to 10 carbon atoms, by known processes (Kunstsoff-Handbuch, volume VIII, p. 695 et seq. Carl Hanser Verlag, Munich, 1973).

Preferred polyalkylene terephthalates A contain at least 80, preferably at least 90 mol %, based on the dicarboxylic acid component, of terephthalic acid radicals and at least 80, preferably at least 90 mol %, based on the diol component, of ethylene glycol and/or butane-1,4-diol radicals.

The preferred polyalkylene terephthalates A can contain, in addition to terephthalic acid radicals, up to 20 mol %, preferably up to 10 mol % of radicals of other aromatic or cycloaliphatic dicarboxylic acids containing from 8 to 14 carbon atoms or aliphatic dicarboxylic acids containing from 4 to 12 carbon atoms such as radicals of phthalic acid, isophthalic acid, naphthalene -2,6- dicarboxylic acid, 4,4'-diphenyl dicarboxylic acid, succinic acid, adipic acid, sebacic acid, azelaic acid, and cyclohexane diacetic acid, The preferred polyalkylene terephthalates A can contain, in addition to ethylene glycol and butane-1,4-diol radicals, up to 20 mol %, preferably up to 10 mol % of other aliphatic diols containing from 3 to 12 carbon atoms or cycloaliphatic diols containing from 6 to 21 carbon atoms, for example radicals of propane-1,3-diol, 2-ethyl propane -1,3-diol,neopentylglycol, pentane-1,5-diol, hexane-1,6-diol, cyclohexane-1,4-dimethanol, 3-ethyl pentane-2,4-diol, 2-methyl pentane-2,4-diol, 2,2,4- trimethyl pentane-1,3 and 1,6-diol, 2-ethyl hexane-1,3-diol, 2,2-diethyl propane-1,3-diol, hexane-2,5-diol, 1,4-di-($\beta$-hydroxyethoxy)-benzene, 2,2 -bis-(4-hydroxycyclohexyl)- propane, 2,4-dihydroxy-1,1,3,3 -tetramethyl-cyclobutane, 2,2-bis-(3-$\beta$-hydroxyethoxyphenyl) -propane and 2,2-bis-(4-hydroxy propoxyphenyl)-propane (DE-OS 24 07 674, 24 07 776, 27 15 932).

The polyalkylene terephthalates A can be branched by incorporating relatively small quantites of 3- or 4-valent alcohols or 3- or 4- basic carboxylic acids, for example according to DE-OS No. 19 00 270 and U.S. Pat. No. 3,692,744. Examples of preferred branching agents include trimesic acid, trimellitic acid, trimethylol ethane and trimethylol propane and pentaerythritol.

Polyalkylene terephthalates A which have been produced merely from terephthalic acid and the reactive derivatives thereof (for example diol alkyl esters thereof) and ethylene glycol and/or butane-1,4-diol, and mixtures of these polyalkylene terephthalates are particularly preferred.

Preferred mixtures contain from 1 to 50, preferably from 1 to 30% by weight of polyethylene terephthalate and from 50 to 99, preferably from 70 to 99% by weight of polybutylene terephthalate.

The polyalkylene terephthalates preferably used as component A generally have an intrinsic viscosity of from 0.4 to 1.5 dl/g, preferably from 0.5 to 1.3 dl/g, in particular from 0.6 to 1.2 dl/g, measured in phenol/O-dichlorobenzene (1:1 parts by weight) at 25° C. in an Ubbelode viscosimeter in each case.

The polymers B having a glass transition temperature below −30° C. should be incompatible to a limited extent with the polyalkylene terephthalates A (in other words should not tend to disintegrate microscopically), i.e. they should be present in component A as discrete particles of a disperse phase having an average particle diameter of from 0.1 to 2.0 μm, as determined by examination under an electron microscope. The expression "not incompatible" with component A refers to products which mix with it in a single phase such as polyether esters (which, moreover, do not fall under the term "polymer").

The polymers B having a glass transtition temperature below −30° C. include copolymers, in particular graft copolymers, having elastic properties, of the type obtained essentially from at least two of the following monomers: chloroprene, buta-1,3-diene, isoprene, styrene, acrylonitrile, ethylene, propylene, vinylacetate and (meth) acrylic acid esters containing from 1 to 18 carbon atoms in the alcohol component, in other words polymers of the type described, for example in "Methoden der Organischen Chemie" (HoubenWeyl), volume 14/1, Georg Thieme Verlag, Stuttgart 1961, pages 393 to 406 and in C. B. Bucknall, "Toughened Plastics" Appl. Science Publishers, London 1977. Preferred polymers B are at least partially cross-linked and have gel contents above 20, preferably above 40% by weight, in particular above 60% by weight.

Ethylene/vinylacetate copolymers containing from 15 to 60% weight of vinylacetate radicals and having melt indices of from non-flowing to 1000, preferably, from 0.1 to 20, measured at 190° C. and 2.16 kg load according to DIN 53 735 are preferred polymers B.

Preferred polymers B also include the so-called EPM and EPDM rubbers in which the ratio by weight of ethylene to propylene radicals lies in the range of from 40:60 to 65:35.

The Mooney viscosities ($ML_{1-4}/100°$ C.) of the EPM and EPDM rubbers can lie between 25 and 200, preferably between 35 and 120.

The ethylene/propylene copolymers (EPM) used have substantially no double-bonds, whereas the ethylene/propylene/diene terpolymers (EPDM) can contain from 1 to 20 double-bonds/1000 carbon atoms. Suitable diene monomers in the EPDM include, for example, conjugated dienes, for example isoprene and buta-1,3-diene, and non-conjugated dienes containing from 5 to 25 carbom atoms, for example 1,4- pentadiene, 1,4- hexadiene, 1,5- hexadiene, 2,5-dimethyl -1,5- hexadiene and 1,4- octadiene; cyclic dienes, for example, cyclopentadiene, cyclohexadiene, cyclooctadiene and dicyclopentadiene, alkenyl norbornenes, for example, 5-ethylidene-2-norbornene, 5-butylidene-2-norbornene, 2-methallyl-5-norbornene, 2-isopropenyl-5-norbornene and tricyclodienes.

The non-conjugated dienes hexane-1,5-diene, ethylidine -norbornene or dicyclopentadiene are preferred. The diene content in the EPDM is preferably from 0.5 to 10% by weight.

EPM or EPDM rubbers of this type are described, for example, in DE-OS 28 08 709.

Preferred polymers B also include selectively hydrated block copolymers of a vinyl-aromatic monomer and a conjugated diene. These block copolymers are known. The technology described in "Encyclopaedia of Polymer Science and Technology", volume 15, Interscience, N. Y. (1971) on pages 508 et seq used for producing styrene-diene block copolymers can generally be used for producing suitable block copolymers from styrene, α-methyl styrene, vinyl toluene etc. and from conjugated dienes such as butadiene, isoprene etc. Selective hydration can be carried out in a known manner, the ethylenic double-bonds being essentially completely hydrated while the aromatic double-bonds remain essentially unaffected. Block copolymers selectively hydrated in this way are described, for example, in DE-OS 30 00 282.

Graft polymers are particularly preferred polymers B.

Preferred graft polymers B possess average particle diameters $d_{50}$ of from 0.05 to 1, preferably 0.1 to 0.8, in particular from 0.2 to 0.6 μm.

The average particle diameter $d_{50}$ is the diameter above and below which there are 50% by weight of the particles respectively. It can be determined by ultracentrifuge measurement (W. Scholtan, H. Lange, Kolloid. Z. and Z. Polymere 250 (1972) 782–796) or by electron microscopy and subsequent counting out of particles (G. Kämpf, H. Schuster, Angew. Makromolekulare Chemie 14, (1970), 111-129).

The graft polymers B are cross-linked and have gel contents of at least 50% by weight, preferably at least 80% by weight and, in particular of at least 90% by weight, based on graft polymer B.

The gel content of the cross-linked diene rubbers is determined at 25° C. in toluene, the gel content of the cross-linked acrylate rubbers at 25° C. in dimethyl formamide (M. Hoffmann, H. Krömer, R. Kuhn, Polymeranalytik I and II, Georg Thieme Verlag Stuttgart 1977).

Preferred graft polymers B are graft polymers of from 15 to 60, preferably from 20 to 50, in particular from 25 to 40% by weight of at least one vinyl or vinylidene monomer from the series comprising styrene, α-methylstyrene, acrylonitrile, $C_1$–$C_8$-alklacrylate, $C_1$–$C_8$-alkylmethacrylate, hydroxy-$C_2$–$C_8$-alkyl(meth)acrylate, epoxy-$C_2$–$C_8$-alkyl-(meth)acrylate to from 40 to 85, preferably from 50 to 80, in particular from 60 to 75% by weight of particulate cross-linked diene rubber or acrylate rubber, based on graft polymer B in each case.

Methylmethacrylate and mixtures of styrene and methylmethacrylate and mixtures of styrene and acrylonitrile are preferred graft monomers.

Cross-linked homo and/or copolymers of conjugated $C_4$-$C_6$-dienes are preferred diene rubbers. Buta-1,3-diene is the preferred diene. The diene copolymers can contain, in addition to the diene radicals, up to 30% by weight, based on diene copolymer, of radicals of other ethylenically unsaturated monomers such as styrene, acrylonitrile, esters of acrylic acid or methacrylic acid with monovalent $C_1$-$C_4$-alcohols such as methacrylate, ethylacrylate, methylmethacrylate, ethylmethacrylate.

The production of the diene rubber grafting matrix and the graft polymers produced therefrom is described, for example, in "Methoden der Organischen Chemie" (HoubenWeyl), volume 14/1, Georg Thieme Verlag, Stuttgart 1961, pages 393–406, and in Ullmanns Encyclopädie der technischen Chemie, fourth edition, volume 19, Verlag Chemie, Weinheim, 1981, pages 279 to 284.

Polymers of the type obtained by polymerisation of $C_1$–$C_8$-alkylacrylates are preferred grafting matrices. The polymers can also be copolymers of acrylic acid esters with up to 40% by weight, based on copolymer, of other vinyl monomers such as styrene, acrylonitrile, methylmethacrylate, vinylester, vinylether.

The acrylate rubbers are cross-linked.

Preferred examples of cross-linking monomers containing more than one copolymerisable double-bond include esters of unsaturated $C_3$–$C_{12}$-monocarboxylic acids and unsaturated monovalent $C_2$–$C_{12}$-alcohols or saturated $C_2$–$C_{20}$-polyols containing from 2 to 4 OH groups, for example, multiply unsaturated heterocyclic compounds such as trivinylcyanurate, triallylcycanurate and i-isocyanurate, in particular triallylcynanurate, polyfunctional vinyl compounds such as di-and trivinyl benzenes, but also triallylphosphate.

Preferred cross-linking monomers include allylmethacrylate, ethylene glycol dimethacrylate, diallylphthalate and heterocyclic compounds, which generally contain three copolymerisable ethylenically unsaturated double-bonds.

The cyclic monomers triallylcyanurate, triallylisocyanurate, trivinylcyanurate, tris-acryloylhexahydro-s-triazine, triallylbenzenes are particularly preferred cross-linking monomers.

The quantity of cross-linking monomers is preferably from 0.02 to 5, in particular from 0.05 to 2% by weight, based on rubber grafting matrix.

With cyclic cross-linking monomers containing at least three ethylenically unsaturated double-bonds, it is advantageous to use not more that 1% by weight, based on rubber grafting matrix.

Acrylate rubbers can also be multi-shelled products containing a cross-linked diene rubber composed of one or more conjugated dienes such as polybutadiene, or a copolymer of a conjugated diene with an ethylenically unsaturated monomer such as styrene and/or acrylonitrile as nucleus and an acrylate monomer which has begun to polymerise as shell.

The proportion of the polydiene nucleus in these multi-shell rubbers can amount to from 0.1 to 80, preferably from 10 to 50% by weight. The shell(s) and nucleus can be partially cross-linked or highly cross-linked independently of each other.

Preferred grafted acrylate rubbers are those which
(a) are cross-linked with cyclic trifunctional comonomers such as triallycyanurate and triallylisocyanurate (described in DE-OS 30 39 114),;
(b) contain a polybutadiene nucleus (described in DE-OS 30 39 115);
(c) have been produced "in the absence of suspending agent" (described in DE-OS 31 17 052).

During the production of the graft polymers B by graft copolymerisation, which is usually carried out in the presence of radical starters, for example, water-soluble initiators, emulsifiers or complex-forming agents/graft activators as well as regulators, free polymers or copolymers of the graft monomers forming the graft shell are generally formed to a certain extent in addition to the actual graft copolymer.

Graft polymers B in the context of the invention are therefore products obtained by polymerisation of graft monomers in the presence of the rubber latex, more precisely generally a mixture of graft copolymer and free (co)polymer of the graft monomers.

The moulding compositions according to the invention have optimal properties if the quantity of free (co)-polymer does not exceed 15% by weight, preferably 10% by weight, in particular 7% by weight, based on component B. The Staudinger index of these free(co)polymers should be less than 0.6 dl/g, preferably less than 0.4 dl/g, measured in dimethyl formamide at 25° C.

Preferred grafted diene rubbers are described, for example, in DE-PS 2 348 377 and in DE-OS 2 927 576, 3 025 605, and preferred grafted acrylate rubbers, for example, in DE-PS 2 444 584 and in DE-OS 2 726 256, 3 039 114, 3 039 115, 3 117 052.

The fluorinated polyolefins B are of high molecular weight and possess glass transition temperatures above $-30°$ C., generally above 100° C., fluorine contents of from 59 to 76, preferably from 65 to 76, in particular from 70 to 76% by weight and average particle diameters $d_{50}$ of from 0.05 to 2, preferably 0.08 to 1 μm. Preferred fluorinated polyolefins B include polytetrafluorethylene, polyvinylidenefluoride, tetrafluorethylene/hexafluoropropylene and ethylene/tetrafluoroethylene copolymers. The fluorinated polyolefins are known (see "Vinyl and Related Polymers" by Schildknecht, John Wiley & Sons, Inc., N.Y., 1952, pages 484–494; "Fluorpolymers" by Wall, Wiley-Interscience, John Wiley & Sons, Inc., N.Y., volume 13, 1970, pages 623–654; "Modern Plastics Encyclopaedia", 1970–1971, volume 47, no. 10 A, October, 1970, McGraw-Hill, Inc., N.Y., pages 134, 138 and 774; "Modern Plastics Encyclopaedia", 1975-1976, October, 1975 volume 52, no. 10 A, McGraw-Hill, Inc., New York, pages 27, 28 and 472, and US-PS 3 671 487, 3 723 373 and 3 838 092).

The fluorinated polyolefins B are preferably used in unsintered form.

If mixtures of aqueous dispersions of the polymer B with a glass transition temperature of below $-30°$ C. and of the fluorinated polyolefin are precipitated together according to the preferred embodiment, as described above, they can be worked up in the normal manner, for example, by spray drying, freeze drying or coagulation by addition of inorganic or organic salts, acids, bases or organic solvents which are miscible with water such as alcohols and ketones, preferably at temperatures of from 20° to 150° C., in particular 50° to 100° C. Drying can be effected at from 50° to 200° C., preferably between 70° and 150° C.

The ratio by weight of polymer B with a glass transition temperature of less than $-30°$ C. and the fluorinated polyolefin in the dispersion mixture can be from 80:20 to 99.9:0.1, in particular from 90:10 to 99:1.

Dispersions of fluorinated polyolefin B which are preferred for this purpose have solids contents of from 30 to 70, in particular from 50 to 60% by weight. The average particle diameter $d_{50}$ present in the dispersions are preferably from 0.05 to 0.8, in particular from 0.1 to 0.5 μm.

As a variation of the preferred embodiment, according to which the polymer B with a glass transition temperature of less than $-30°$ C. and the fluorinated polyolefin B are precipitated together, commonly precipitated product B can be combined with polymer B having a glass transition temperature of less than $-30°$ C. (which is free from fluorinated polyolefin B). Thus, for example,
(a) from 25 to 75, preferably from 40 to 60 parts by weight of polymer B having a glass transition temperature of less than −30° C. and fluorinated polyolefin B which have been precipitated together from a mixture of aqueous dispersions of both polymers (b) from 75 to 25, preferably from 60 to 40 parts by weight of polymer B having a glass transition temperature of less than −30° C. (which is free from fluorinated polyolefin B) and optionally (c) an adequate quantity of fluorinated polyolefin, which is sufficiently high to produce the required content of fluorinated polyolefin in the moulding composition A +B after mixing components a+b+c with polyester A.

Conversely, it is obviously also possible to use (a) polymer B having a glass transition temperature of less than −30° C. and fluorinated polyolefin B, which have been precipitated together from a mixture of aqueous dispersions of both polymers, and (b) fluorinated polyolefin B together.

Owing to the low fluorinated polyolefin B content in the moulding compositions according to the invention, the range of possible mixing ratios is correspondingly small.

The moulding compositions according to the invention can contain conventional additives such as lubricants and mould release agents, nucleation agents, stabilizers, fillers and reinforcing materials, flame proofing agents and dyes.

The filled and reinforced moulding compositions can contain up to 60, preferably from 10 to 60% by weight, based on the filled and reinforced moulding composition, of filler and/or reinforcing materials. Glass fibres are preferred reinforcing materials. Glass beads, mica, silicates, quartz, talcum, titanium dioxide and wollastonite are preferred fillers which can also have a reinforcing effect.

The moulding compositions provided with flame proofing agents contain flame proofing agents in a concentration which is generally from 3 to 15% by weight, based on the flame-proofed moulding compositions.

Any known flame proofing agents such as polyhalogen diphenyl, polyhalogen diphenyl ether, polyhalogenphthalic acid and derivatives thereof and polyhalogenoligo-and polycarbonates can be used, the corresponding bromine compounds being particularly effective. They generally also contain a synergist such as antimony trioxide.

The moulding compositions according to the invention preferably contain no flame proofing agents, in particular no halogenated polymers (obviously except for the fluorinated polyolefins of components B). In this context, "no" means no quantities of the type generally required for flame proofing, i.e. more than 1% by weight, based on the components A+B.

The production of the mixtures from thermoplastic polyester A, polymer B and optionally further components can be effected in conventional mixer units such as rollers, kneaders, single and multiple shaft extruders. The temperature during production of the mixtures should be at least 10° C. and preferably at most 90° C. above the melting point of the polyester.

The process according to the invention can be carried out discontinuously or continuously under conditions under which an oxidation is substantially eliminated, i.e. under inert protective gas such as nitrogen, carbon dioxide, argon or helium and/or reduced pressure. Any apparatus which provides these conditions is suitable.

The shaped articles produced from the moulding compositions according to the invention by injection moulding or extrusion are particularly suitable when high impacts have to be withstood, for example in the motor industry for shock absorbers, spoilers, bumpers, car body parts, steering wheels, steering columns.

The parts mentioned in the following examples are parts by weight. Percentages relate to the weight.

EXAMPLES

A. Components used

1. Polybutylene terephthlate having an intrinsic viscosity of 1.20 dl/g measured in phenol/o- dichlorbenzene (weight ratio 1:1) at 25° C. in an Ubbelohde viscosimeter.

2. Graft polymer from 75% by weight of polybutadiene graft matrix (gel content 85% by weight) and 25% by weight of graft overlay from 72 parts by weight of styrene and 28 parts by weight of acrylonitrile having an average particle diameter $d_{50}$ of 0.4 μm, produced according to EP-A 22 216.

3. Graft polymer from 71.25% by weight of polybutadiene graft matrix (gel content: 85% by weight), 23.75% by weight of graft overlay from 72 parts by weight of styrene and 28 parts by weight of acrylonitrile, precipitated together with 5% by weight of polytetrafluorethylene.

4. Aqueous dispersion of polytetrafluoroethylene (solids content: 60% by weight; fluorine content: 73% by weight, based on solids).

5. Polytetrafluoroethylene powder.

6. Processing auxiliaries/stabilizers.

B. Production of the moulding compositions

1. Production of component A3:

100 parts by weight of a 40% by weight aqueous dispersion of the graft polymer A.2 and 3.5 parts by weight of a 60% by weight polytetrafluoroethylene dispersion were mixed and stabilized with 1.8% by weight, based on polymer solids, of phenolic antioxidants.

The mixture was coagulated with an aqueous solution of magnesium sulphate (Epsom salt) and acetic acid at from 85 to 95° C and at pH 4 to 5, was filtered and washed free of electrolyte, and was then freed from the majority of water by centrifugation and subsequently dried to a powder at 100° C.

2. Further processing of the products of common precipitation:

The powdered component A3 was mixed with components A1 and A6 and optionally A2 and optionally A5 in the melt and was extruded. The mass temperatures were from 270 to 280° C. The strand of molten material was degassed prior to leaving the nozzle, then cooled in water, granulated and dried.

The composition of the moulding compositions can be seen from Table 1.

The moulding compositions were pre-dried and then injected on a conventional injection moulding machine at mass temperatures of from 250° to 260° C. and at a mould temperature of 80° C. to form standard test rods. The test results are compiled in Table 2.

TABLE 1

| Component | Designation | Composition of the moulding compositions [% by weight] | | | | | | | |
|---|---|---|---|---|---|---|---|---|---|
| | | 1[1] | 2 | 3 | 4 | 5 | 6 | 7 | 8[1] |
| PBT | A1 | 76.6 | 76.6 | 76.6 | 76.6 | 76.7 | 76.8 | 77.4 | 76.7 |
| Graft polymer | A2 | — | 7 | 13 | 19 | 22 | 22 | 22 | 23 |
| Graft polymer | A3 | 23 | 16 | 10 | 4 | — | — | — | — |
| Polytetrafluorethylene | A5 | — | — | — | — | 0.9 | 0.8 | 0.4 | — |
| Auxiliary | A6 | 0.4 | 0.4 | 0.4 | 0.4 | 0.4 | 0.4 | 0.4 | 0.4 |
| Total content of polytetrafluorethylene | | 1.15 | 0.8 | 0.5 | 0.2 | 0.9 | 0.8 | 0.2 | — |

[1]Comparison example

TABLE 2

| | Properties of standard test rods | | | | | | | |
|---|---|---|---|---|---|---|---|---|
| | 1[1] | 2 | 3 | 4 | 5 | 6 | 7 | 8[1] |
| Impact resistance $a_n$ (kJ/m$^2$)[2] | 80 | 80 | 77 | 73 | 83 | 81 | 74 | 72 |
| Notched bar toughness $a_k$ (kJ/m$^2$)[2] | | | | | | | | |
| R.T. | 47 | 52 | 53 | 44 | 48 | 51 | 47 | 39 |
| 0° C. | 40 | 49 | 52 | 42 | 44 | 47 | 43 | 36 |
| −10° C. | 31 | 44 | 50 | 39 | 38 | 43 | 42 | 35 |
| −20° C. | 13 | 37 | 45 | 34 | 30 | 38 | 37 | 13 |
| −30° C. | 10 | 18 | 40 | 17 | 15 | 18 | 18 | 13 |
| Modulus of Elasticity (MPa)[3] | 2050 | 2178 | 2250 | 2195 | 2110 | 2230 | 2180 | 1790 |
| of Elongation | | | | | | | | |
| $\sigma B$ (MPa)[4] | 42 | 43 | 43 | 44 | 42 | 45 | 42 | 38 |
| $\sigma R$ (MPa)[4] | 40 | 39 | 44 | 42 | 40 | 41 | 40 | 26 |
| $\epsilon R$ (MPa)[4] | 215 | 260 | 256 | 276 | 196 | 215 | 240 | 119 |

[1]Comparison Test
[2]According to DIN 53 453
[3]According to DIN 53 457
[4]According to DIN 53 455

We claim:

1. A thermoplastic moulding composition comprising
A. from 65 to 99% by weight, based on the sum of A+B, of polybutylene terephthalate and
B. from 1 to 35% by weight, based on the sum A+B, of a graft copolymer wherein the graft copolymer is comprised of from 15 to 60%, by weight of the graft copolymer, of a graft monomer selected from styrene, α-methylstyrene, acrylonitrile, C$_1$-C$_8$ alkylacrylates, C$_1$-C$_8$ alkylmethacrylates, hydroxy-C$_2$-C$_8$-alkylacrylates, hydroxy-C$_2$-C$_8$-alkylmethacrylates, epoxy-C$_2$-C$_8$-alkylacrylates and epoxy-C$_2$-C$_8$-alkylmethacrylates grafter onto 40-85%, by weight of the graft copolymer, of a crosslinked diene rubber having a glass transition temperature of less than −30° C. and a gel content of at least 50% by weight, based on the weight of the graft copolymer, and from 0.1 to 0.9% by weight, based on the weight of the sum of A+B, of a fluorinated polyolefin.

2. Moulding composition according to claim 1, characterised in that the graft copolymer B is composed of at least one graft copolymer having a glass transition temperature of less than −40° C. and, based on the moulding composition A+B, from 0.1 to 0.9% of weight of fluorinated polyolefin.

3. Moulding composition according to claim 1 or 2, characterised in that it contains from 0.2 to 0.8% by weight of fluorinated polyolefin, based on the moulding composition A+B.

4. Moulding composition according to claims 1 or 2, characterised in that it contains from 0.3 to 0.7% by weight of fluorinated polyolefin, based on the moulding composition A+B.

5. Moulding composition according to claims 1 or 2, characterised in that the fluorinated polyolefin is polytetrafluoroethylene.

6. Moulding composition according to claims 1 or 2, characterised in that the polymer B has been obtained by mixing aqueous dispersions of the fluorinated polyolefin and of the polymer having a glass transition temperature of less than −30° C. and by common precipitation.

7. Moulding composition according to claims 1 or 2, characterised in that it contains from 10 to 60% by weight, based on filled or reinforced moulding composition, of fillers and/or reinforcing materials.

8. A moulding composition according to claim 1, wherein the cross-linked diene rubber is a homopolymer of a conjugated diene containing from four to six carbon atoms or a copolymer of a conjugated diene containing from four to six carbon atoms and up to 30% by weight, based on the weight of the diene copolymer of styrene, acrylonitrile, or esters of acrylic acid or methacrylic acid with mono valent alcohols containing from one to four carbon atoms.

* * * * *